United States Patent [19]
Stark

[11] Patent Number: 5,913,360
[45] Date of Patent: Jun. 22, 1999

[54] DUAL PASS COOLING PLATE TYPE CROSS FLOW AIR TO AIR HEAT EXCHANGER WITH AIR FLOW DAMPER CONTROLS

[75] Inventor: Walter Stark, Halesite, N.Y.

[73] Assignee: Nautica Dehumidifiers, Inc., Huntington, N.Y.

[21] Appl. No.: 09/165,322

[22] Filed: Oct. 2, 1998

Related U.S. Application Data

[63] Continuation-in-part of application No. 08/527,653, Sep. 13, 1995, Pat. No. 5,816,315.

[51] Int. Cl.$^6$ ...................................................... F25B 29/00
[52] U.S. Cl. ............................. 165/66; 165/166; 165/54; 165/103; 62/90; 62/93; 62/95
[58] Field of Search ................................. 165/66, 54, 166; 165/103; 62/90, 93, 95

[56] References Cited

U.S. PATENT DOCUMENTS

| | | |
|---|---|---|
| 2,093,725 | 9/1937 | Hull . |
| 2,128,641 | 8/1938 | Folsom . |
| 2,828,947 | 4/1958 | Hedbom . |
| 3,265,129 | 8/1966 | Bawabe . |
| 3,513,907 | 5/1970 | Hughes . |
| 3,666,007 | 5/1972 | Yoshino et al. . |
| 3,860,065 | 1/1975 | Schauls . |
| 3,866,674 | 2/1975 | Tramuta at al. . |
| 4,041,591 | 8/1977 | Noll et al. . |
| 4,051,898 | 10/1977 | Yoshino et al. . |
| 4,099,928 | 7/1978 | Norback . |
| 4,334,577 | 6/1982 | George . |
| 4,377,201 | 3/1983 | Kruse et al. . |
| 4,377,400 | 3/1983 | Okamoto et al. . |
| 4,429,735 | 2/1984 | Wonaguchi et al. . |
| 4,512,397 | 4/1985 | Stark . |
| 4,517,810 | 5/1985 | Foley et al. . |
| 4,761,966 | 8/1988 | Stark . |
| 4,862,953 | 9/1989 | Granetzke et al. . |
| 4,971,137 | 11/1990 | Thompson . |
| 4,998,580 | 3/1991 | Guntly et al. . |
| 5,036,907 | 8/1991 | Leven . |
| 5,279,360 | 1/1994 | Hughes et al. . |
| 5,816,315 | 10/1998 | Stark ........................................ 165/66 |

FOREIGN PATENT DOCUMENTS

| | | |
|---|---|---|
| 470100 | 12/1950 | Canada . |
| 818603 | 8/1959 | Canada . |
| 0086175 | 2/1983 | European Pat. Off. . |
| 2514713 | 10/1975 | Germany . |
| 2616556 | 5/1977 | Germany . |
| 47-019990 | 2/1971 | Japan . |
| 54-44255 | 4/1979 | Japan . |
| 55-121394 | 9/1980 | Japan . |
| 55-160297 | 12/1980 | Japan . |
| 851082 | 7/1981 | U.S.S.R. . |

Primary Examiner—John K. Ford
Attorney, Agent, or Firm—Abelman, Frayne & Schwab

[57] ABSTRACT

A heat exchanger for dehumidifying an air stream including heat conducting plates which serve as the heat exchange surface for precooling and reheating the air during the dehumidification process. Cooling conduits are positioned in a plane parallel to a plane defined by the heat conducting plates, such that cooling occurs in the intake air stream and heating occurs in the exhaust air stream, and the air flow is redirected in a small plenum chamber located at an end of the channels adjacent to the cooling conduits. A system is also provided which includes a plurality of heat exchangers joined edge corner to edge corner sharing a common cooling coil and a common plenum chamber. The heat exchange system includes a fan for conducting air through the heat exchangers and through the cooling coil, a manifold assembly which includes an intake damper, exhaust damper, and baffle dampers, and a cooling damper disposed in a condensate collection chamber.

12 Claims, 13 Drawing Sheets

DUAL PASS COOLING PLATE TYPE CROSS FLOW AIR TO AIR HEAT EXCHANGER WITH AIR FLOW DAMPER CONTROLS

This application is a Continuation-in-Part of patent application Ser. No. 08/527,653 filed Sep. 13, 1995. now U.S. Pat. No. 5,816,315 issued Oct. 6, 1998

BACKGROUND OF THE INVENTION

1. Field of the Invention

The present invention relates to an improvement in the dehumidification of air through the provision of a plate type cross flow air to air heat exchanger having a series of parallel plates enclosed in a housing which conducts flowing air to be redirected for exhaust in a plenum chamber where it is cooled in a two pass flow path through a cooling coil which consists of a plurality of cooling conduits or tubes which are separated by and held as a single unit by a multitude of fins through which cooling conduits pass. The plate type cross flow air to air heat exchanger makes possible a regenerative heat exchange between the intake and exhaust airstreams.

The invention further provides for the cooling coil to be arranged in a manner in which the individual cooling conduits extend in a plane which is parallel to the plane defined by the series of plates, while the fins and the cooling coil unit extend in a plane perpendicular to the plane defined by the series of plates. The cooling coil is positioned in the plenum chamber so that the air flowing through the heat exchanger passes through the cooling conduits twice before it exits the housing. The invention further includes the provision of arranging a number of the air to air plate heat exchangers joined edge corner to edge corner, utilizing a common cooling coil and a common plenum chamber to reduce the cost and size of the system, while at the same time reducing the fan energy requirements for operating the system to condition a large flow of air.

The invention further provides for a manifold assembly with intake, exhaust and baffle dampers and a cooling damper disposed in the condensate collection chamber. The function of the baffle dampers is to make possible an increase in the cooling capacity of the system by providing for cooling of the air stream by passing it through both passes of the air to air heat exchanger simultaneously with the cooling damper open and the exhaust damper closed. The baffle dampers are also open in the bypass and maximum bypass modes, and the lowest possible pressure drop across the system occurs in the maximum bypass mode, in which mode the intake, exhaust, baffle, and cooling dampers are all in the open position.

2. Discussion of Prior Art

Air conditioning in residences, office buildings, commercial structures, and other types of buildings typically requires large amounts of energy to provide comfortable ambient indoor air under a variety of weather conditions, depending upon the climate and the season. Systems that cool and/or dehumidify air are widely employed, whereby as the air is cooled, moisture condenses out of the air resulting in cooler and drier air being returned to the building interior.

In the design of a dehumidifying heat exchanger, an important determination is whether, and how much heating, called in the industry by the term "reheat", will be applied to the air after it has been cooled for the purpose of dehumidifying it. If the cooled, and thus dehumidified air is simply supplied to the ambient interior space without further heating, it is traditional air conditioning, and in doing so, the air may be overcooled in the process. However, in typical dehumidification systems, the air is reheated before being supplied to the ambient interior space. In these systems, one aims to control ambient humidity, not temperature, and the system is controlled by a humidistat which engages and shuts the system down.

In the prior art, there exists a variety of heat exchange devices utilizing a regenerative type of heat exchange airflow in which air passes through the housing in intake channels and is then redirected through exhaust channels. Cooling fluids are provided so that the air passes over the conduits which are typically arranged in a plane perpendicular to the channels and which are in thermal contact with the walls defining the channels, so that the conduits typically pass through the walls. An example of such a regenerative heat exchanger is disclosed in U.S. Pat. No. 2,128,641 to Folsom, which discloses a dehumidifier in which the walls between the channels serve as the heat exchange surface for air as it passes through the intake channels, over the cooling conduits, and then around the channel walls in a plenum chamber into the exhaust channels and back over the cooling conduits. The air is then exhausted back into the atmosphere through exhaust ports located adjacent to the intake ports at the first end of the unit.

U.S. Pat. No. 4,761,966 to Stark teaches cooling and reheating for dehumidification in a cross flow arrangement, as well as an air temperature and water temperature control system for high humidity locations such as indoor pools. U.S. Pat. No. 4,517,810 to Foley et al. teaches regenerative heat exchange using a "run around loop," and Canadian Patent No. 470,100 teaches the use of a corrugated plate in a heat exchange element. U.S. Pat. No. 2,093,725 to Hull teaches the provision of cooling conduits sandwiched between the heat conducting walls of the heat exchanger.

In the prior art heat exchangers, there is generally required a large plenum space to convey the intake air to the cooling conduit or to convey exhaust air leaving the cooling conduit to the final pass through the regenerative heat exchanger. The large plenum space in the prior art could be disposed either upstream of the cooling conduit or downstream of the cooling conduit. Accordingly, prior art heat exchangers required a large area for installation, and also required an excessive amount of energy to force the air through the heat exchanger. Efforts to reduce the plenum space, such as that shown in Folsom, require that the cooling conduits be constructed to pass through the plates of the heat exchanger.

Volumetric efficiency quantifies the required equipment volume in per unit of capacity at a given performance level. In plate type cross flow air to air heat exchangers, to increase the volumetric efficiency and economy of the unit, the smallest possible plate size should be used. However, cross flow heat exchangers with smaller plates require more length, i.e., more plates, to handle air volumes equal to that of units with larger plates. Increasing the plate size will require a larger installation space which may limit the performance of the heat exchanger. In addition, when using cross flow type plate air to air heat exchangers with smaller plates, the length, or number of plates, typically exceeds a required maximum dimension or number and therefore additional rows of small plate heat exchangers are added side by side. The cooling coil, as stated above, consists of a plurality of tubes which are separated by a series of fins serving as a heat transfer surface for the tubes. Generally, cooling coils have many circuits, each circuit comprising a multitude of cooling tubes connected in series, from entrance to exit, using U-shaped bends. Therefore, for economic and efficient cooling coil selection, the cooling tubes in the prior art tend to run substantially perpendicular to the heat exchanger plates. However, this arrangement requires that each cooling tube or tube circuit be separately balanced due to the temperature gradient across the coil surface, because the temperature leaving a cross flow heat exchanger varies in a direction parallel to the plates. As the coolant fluid passes through the tubes, it absorbs heat sufficient to cool the air which passes over the tubes, typically in the range of 35° F. to 55° F. As the heat is absorbed over the length of the tube or circuit, it is most efficient to have substantially equal temperature conditions, and refrigerant superheating, leaving each tube or circuit. In prior art heat exchangers, as seen in FIG. 1, when the tubes are arranged perpendicularly to the plates, the individual tubes or circuits see different temperatures in the air stream, requiring manual, and tedious, balancing of the individual tubes or circuits to ensure equal heat absorption and temperature drops, and thus optimum cooling of the air stream. If the cooling coil of FIG. 1 were placed at the entrance to the exhaust side of the cross flow heat exchanger, performance would improve somewhat because there is more room for mixing of temperature to occur in the plenum chamber. However, the degree of mixing is unpredictable and would be irregular in a confirmed space such as the plenum chamber.

The novel heat exchanger for dehumidification of the present invention obviates the disadvantages associated with the prior art by providing a plate type cross flow heat exchanger having a plurality of plates and a cooling coil consisting of tubes and fins, in which the cooling conduits are arranged in parallel to a plane defined by the plates of the heat exchanger, while the coil fins extend in a plane generally perpendicular to the plane defined by the plates, together with a manifold assembly which includes intake, exhaust, and bypass dampers, and a cooling control damper adjacent to the cooling coil. The cooling coil in the condensate collection chamber is located adjacent to but spaced from the heat exchanger walls while maintaining a seal between the intake channels and exhaust channels as will be described below, and is located in a plenum chamber which redirects the air back over the cooling coil so that a two pass arrangement is achieved as the air passes from the intake channels to the exhaust channels for return to the ambient atmosphere. The heat exchanger of the present invention also facilitates installation in a system which utilizes a number of small units which are operated utilizing a common cooling coil, and may also utilize a common plenum space to reduce the size required for installation and ultimately provide an efficiently operating, energy conserving, and economical system for dehumidifying air in buildings such as residences, office buildings, and commercial structures.

SUMMARY OF THE INVENTION

In heat exchange systems, two air streams are allowed to pass in channels in close proximity to each other, where the channels are separated by a heat conducting surface which, on one side comprises the heat conducting channel wall for the intake air stream, and on the other side comprises the heat conducting channel surface for the exhaust airstream. By so arranging the flow of air, temperature differences between the intake air and the exhaust air provides for thermal transfer through the surface with heat naturally flowing from the higher temperature air to the low temperature air.

In the present invention, the apparatus is utilized as a dehumidifier, where the intake air is precooled in a regenerative heat exchanger and then further cooled through the provision of a two pass air cooling arrangement. The air cooling process naturally condenses water vapor entrained in the intake air, which along with condensed and condensing water, flows into a condensation collection chamber which is part of the plenum chamber at the closed end of the apparatus. Condensing water drops into a collection chamber, while the cooled intake air is redirected from the intake direction of the air flow for a second pass through the air cooling arrangement. The exhaust air flow travels through the exhaust channels, of which at least one wall or surface of the channel represents the wall or surface separating the intake channel from the exhaust channel. The heat exchange process flows through this wall or surface, where the cooled and dehumidified air is then warmed to return to the ambient interior space at a comfortable temperature.

The apparatus of the present invention includes a plurality of heat conducting surfaces arranged in side-by-side parallel arrangement, and the entire heat exchange plate arrangement has a generally square or diamond shape. The number of exhaust and intake channels is determined by the number of plates provided, which is variable with respect to the installation in which the heat exchanger will be utilized. The square shape of the heat exchanger is preferably positioned on a point of the square, such that a diamond running from one corner of the square to its opposite square is generally vertical, when the dehumidifying unit is installed in a building.

The heat exchanger plates, or heat conducting walls or surfaces, are preferably provided with means for enhancing the heat conduction process, such as heat conducting spacers, or preferably, a series of corrugations which extend between the wall or surfaces and are in thermal contact with each of the walls or surfaces. The corrugations serve the dual purpose of enhancing heat transfer between the walls or surfaces to facilitate the heat transfer process, and also provide flow paths for the air stream to seal the intake channels from the exhaust channels. The preferred arrangement is a cross flow arrangement, and in this arrangement, the corrugations for the intake channels are substantially arranged at right angles to the corrugations for the exhaust channels, to define the flow path through the heat conducting surfaces so that the intake air flow is in a substantially crossflow arrangement with respect to the exhaust air flow.

The present invention includes a manifold assembly having an intake port with an attached intake damper, an exhaust port with an attached exhaust damper, and baffle dampers. The intake port with the attached intake damper is in fluid communication with the intake channels of the plate heat exchangers. Similarly, the exhaust port with the attached exhaust damper is in fluid communication with the exhaust channels of the plate heat exchanger.

The present invention also comprehends a manifold assembly, plate heat exchangers, a plate heat exchanger frame, cooling coil or conduit, a condensate collection chamber, arranged in a particular configuration. The manifold is disposed above the plate heat exchanger and attached to the plate heat exchanger frame. The cooling coil is located beneath the plate heat exchangers and plate heat exchanger frame and disposed within the plenum chamber. Located beneath the cooling coil is the condensate collection chamber and a cooling coil damper, which is attached to the condensate collection chamber.

The present invention includes a housing, having an intake port at the proximal end which is located adjacent to the intake channels and in fluid communication therewith, and also includes an exhaust port in fluid communication with the exhaust channels also at the proximal end. Located at the distal end of the housing is a plenum chamber, and inside the plenum chamber is a cooling coil having cooling conduits or tubes and thin walled fins extending between and supporting the tubes, which pass through the fins. The coil further cools the air and condenses water vapor entrained in the air to dehumidify the air.

The cooling coil has cooling conduits or tubes and thin walled fins extending between and supporting the tubes which pass through the fins. The coil further cools the air and condenses water vapor entrained in the air to dehumidify the air. The conduits or tubes of the cooling coil are preferably arranged and extend in a plane which is parallel to a plane defined by the heat conducting plates. The cooling coil itself, and in particular the fins, extends in a plane perpendicular to the plane of the plates, while maintaining the conduits in the same plane as the plates. This permits the air to flow uniformly over the cooling conduits to provide for a more efficient cooling process so that each tube and circuit sees substantially the same temperature profile.

A fan conducts the air stream into the heat exchanger of the present invention, as is conventional, through the intake port with the attached intake damper so that the air stream enters the heat exchanger at the intake channels. As the air stream passes through the heat exchanger, it is precooled through the heat exchange process with the heat conducting walls or plates and corrugations. The precooled air then exits the plate heat exchanger intake channels and passes through the cooling coil to condense water vapor entrained in the air stream, which is then collected in a collection chamber, which is part of the plenum chamber. The plenum chamber redirects the air so that it passes through the cooling coil in a second pass to further condense water vapor and then enters at the exhaust channels, where it is warmed through the heat exchange process with the heat conducting walls or plates and the corrugations, prior to exiting the plate heat exchanger at the exhaust port with its attached exhaust damper. The air exiting the plate heat exchanger of the present invention is thus cooler and drier as it is returned to the ambient interior space.

A further embodiment of the present invention includes a plurality of plate heat exchange assemblages, which includes a cooling coil which is common to each of the plate heat exchangers. The cooling conduits or tubes are arranged in a plane parallel to a plane defined by the plates which form the heat conducting plates of each of the individual plate heat exchangers. It is also contemplated that the plenum chamber may be a common plenum chamber for the cooling coil with the associated assemblage of plate heat exchangers.

The present invention provides a thermally regenerative heat exchange system for dehumidification which increases the efficiency and reduces the physical space formerly required for installation of prior art devices. By arranging the cooling coil so that the cooling conduits are parallel to the plane defined by the plates of the heat exchanger, each set of plate heat exchangers becomes a self-balancing system with respect to the coolant fluid passing through the conduits. The present invention is less expensive to manufacture and easier to maintain, and the present invention also accommodates larger systems by providing a means for arranging a number of the plate heat exchangers side-by-side, edge corner to edge corner, utilizing a common cooling conduit and a common plenum chamber.

BRIEF DESCRIPTION OF THE DRAWINGS

The foregoing features of the present invention will become more readily apparent and may be understood by referring to the detailed description of an illustrative embodiment of the heat exchanger for dehumidification, taken in conjunction with the accompanying drawings, in which.

DETAILED DESCRIPTION OF THE PREFERRED EMBODIMENT

Figure 1:
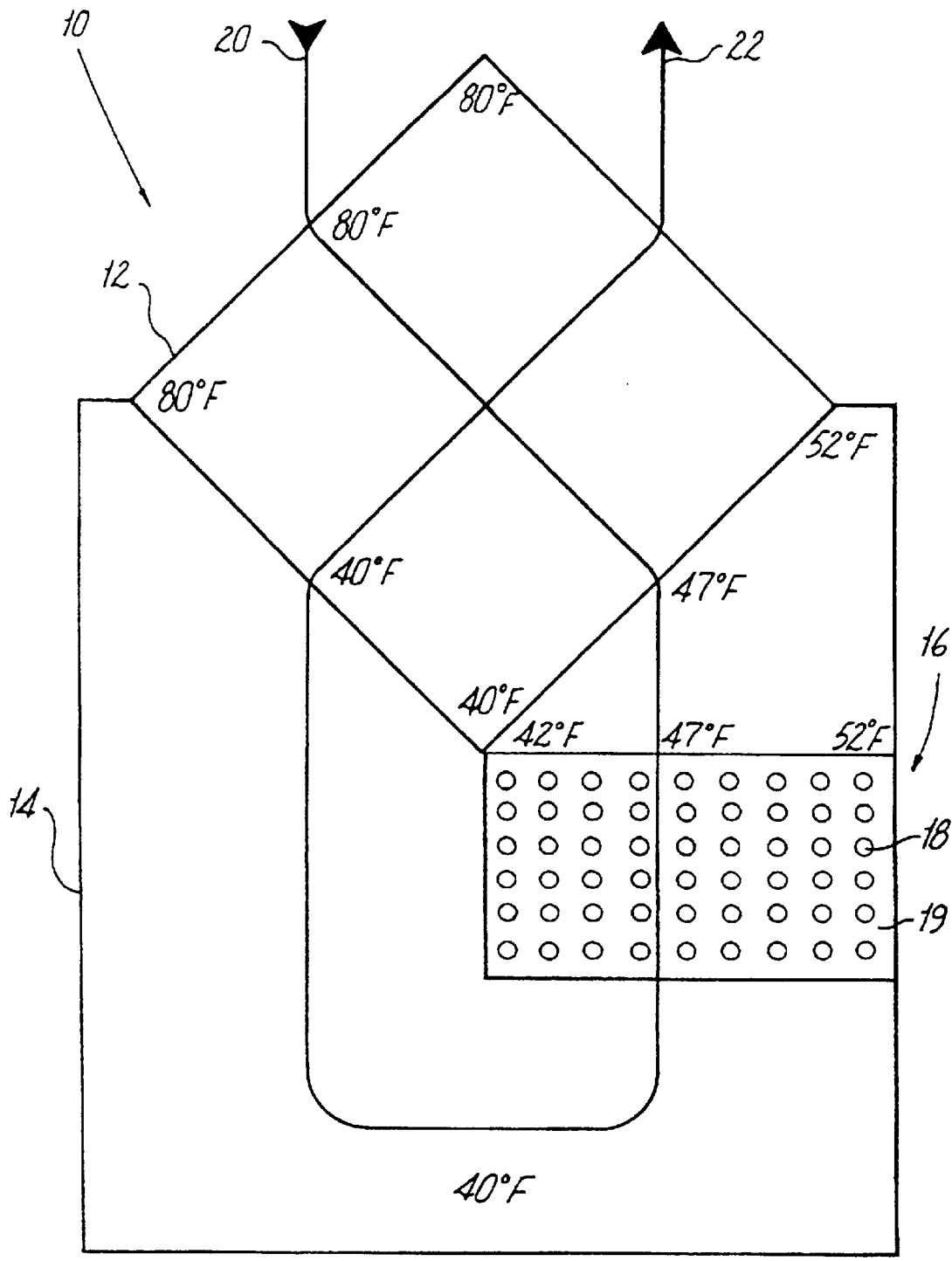
FIG. 1 is a schematic representation of a prior art plate-type cross flow air-to-air heat exchanger showing the flow path of the air stream.

Turning now to the drawings, in which like reference numerals identify similar or identical elements throughout the several views, FIG. 1 illustrates a plate type cross flow air to air heat exchanger which is common to the prior art. Such a plate heat exchanger 10 includes a plurality of plates comprising heat conducting plates 12 through which the air stream passes. Heat conducting plates are connected to a plenum chamber 14 which redirects the air flow as it enters the plenum chamber through the intake channels to be exhausted through the exhaust channels and into the conditioned environment. As the air passes from the intake channels into the plenum chamber 14, the air passes through a cooling coil 16 which includes a plurality of coolant carrying conduits or tubes 18 and a plurality of thin wall fins 19 extending the length of the coil through which the tubes 18 pass. Tubes 18 are arranged generally perpendicular to a plane defined by the heat conducting plates 12. As seen in FIG. 1, the air stream enters in the direction of arrow 20 and passes between the heat conducting plates 12 and into the plenum chamber 14. The air stream then passes through the cooling coil 16 where water entrained in the air stream is condensed out of the air stream and then the air stream is redirected by the plenum chamber and exits through the exhaust channels of the heat conducting plates 12 in the direction of arrow 22.

Figure 2:
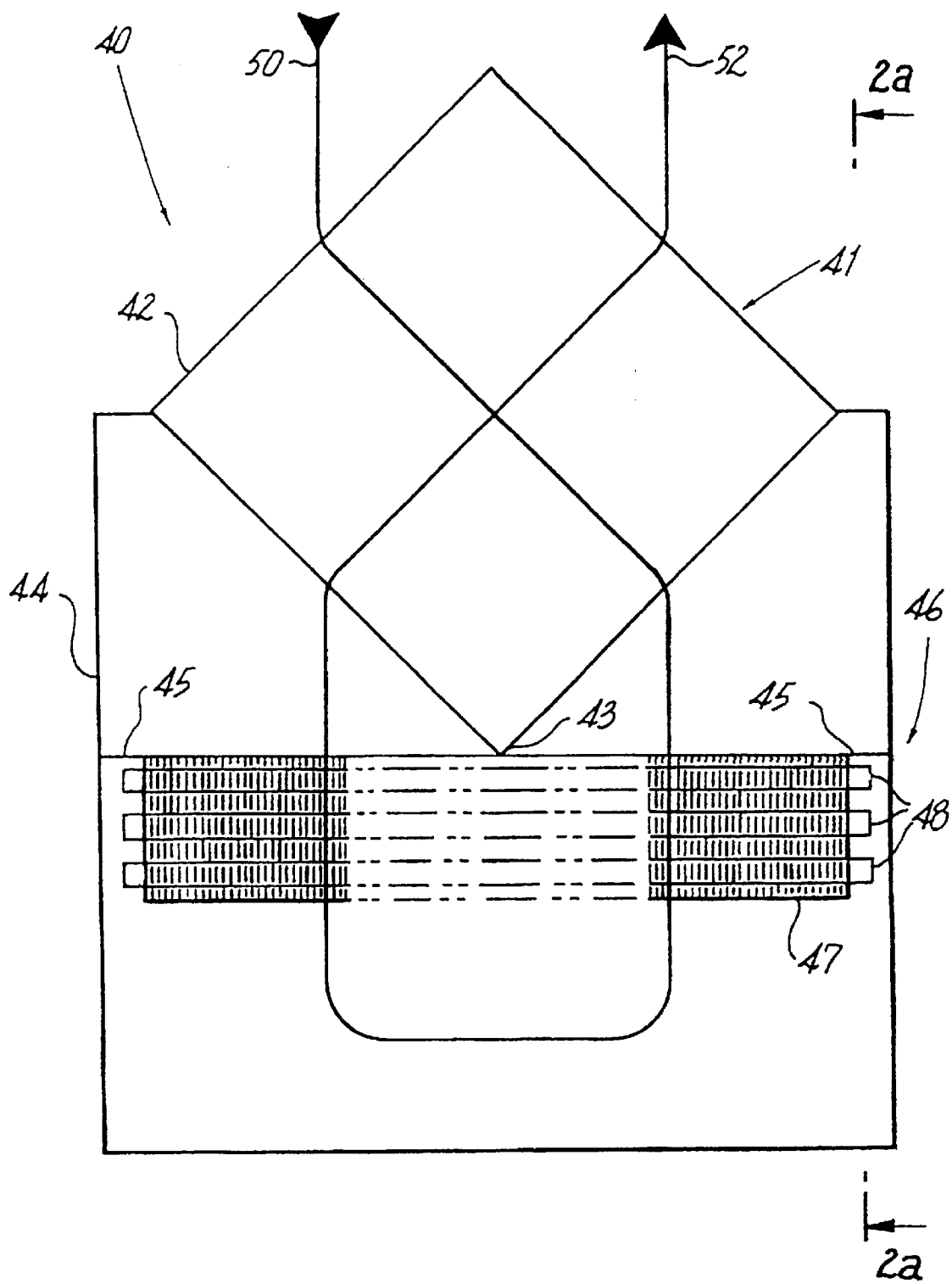
FIG. 2 illustrates a preferred embodiment of the plate type cross flow air-to-air heat exchanger of the present invention.
Figure 2A:
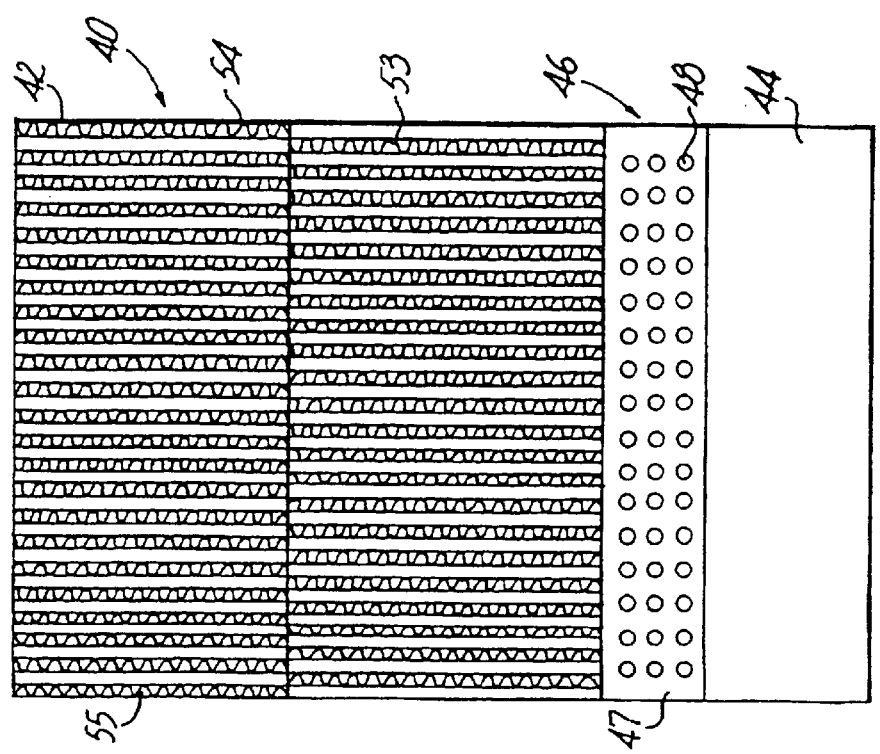
FIG. 2a illustrates a side view of the heat exchanger taken 90° from the view shown in FIG. 2, along lines 2a—2a of FIG. 2.

FIG. 2 illustrates the plate type cross flow air to air heat exchanger according to the present invention. As seen in FIG. 2, heat exchanger 40 includes plate or wall assembly 41, which includes a plurality of heat conducting plates 42 which are attached to plenum chamber 44. In the present invention, the cooling coil 46 is positioned so that coolant carrying tubes 48 are positioned in a plate which is parallel to the plane defined by the heat conducting plates 42. The cooling coil 46 itself, including fins 47, extends in a plane generally perpendicular to a plane defined by the plates 42. As seen in FIG. 2a, heat conducting walls or plates 42 of heat exchanger 40 extend in a plane generally parallel to a plane in which the tubes 48 run. Fins 47 run generally perpendicular to the plane walls or plates 42 are located in.

Referring back to FIG. 2, as air enters the intake side of the heat exchanger housing (not shown) in the direction of arrow 50, it enters the intake channels of the heat conducting walls or plates 42 and passes into the plenum chamber 44 where it passes through the cooling coil 46 for a first pass. The coil is secured to the walls 42 at bead 43 which provides a seal to ensure that the air flow passes through the cooling coil 46. Ledge member 45 serves a similar function. The construction of the plenum chamber redirects the air stream so it passes through the cooling coil 46 for a second pass prior to exiting the plenum chamber 44 through the exhaust channels and out the exhaust side of the plate heat exchanger 40 in the direction of arrow 52.

As the intake airstream passes over the coil for the first time or first pass, while it is desirable for the temperature profile of the airstream to be as uniform as possible, there may be some variations due to temperature differences within the various channels, which then passes over the various cooling conduits, etc. The present invention permits the cooling conduits to be equally exposed to the varying temperature profile and in the second pass through the cooling coil the present invention permits the airstream to mix and reach a substantially uniform temperature in the plenum chamber. The airstream which then passes over the coil the second time is then more efficiently cooled due to the uniformity of the temperature. The air passing through the cooling coil of the prior art heat exchangers does not have a uniform temperature gradient and therefore is not as efficiently cooled as in the device of the present invention.

Figure 3:
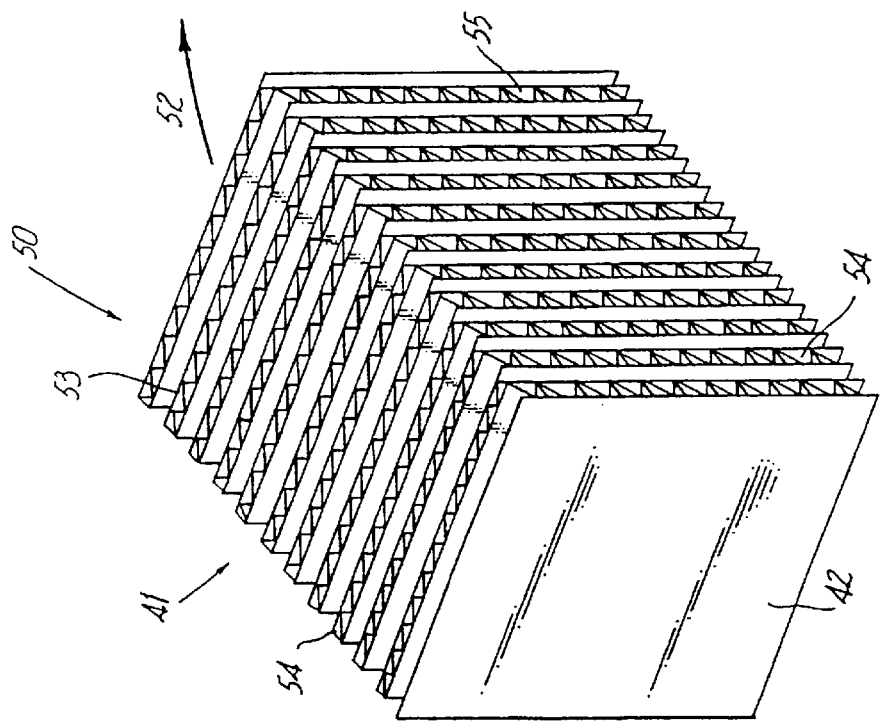
FIG. 3 illustrates a perspective view of the heat conducting plates and the corrugations provided between the walls or plates of the plate type heat exchanger of FIG. 2.

As seen in FIG. 3, wall or plate assembly 41 includes the heat conducting walls or plates 42 which are positioned side-by-side in a parallel arrangement, and may include a means for enhancing the heat transfer between the heat conducting plates 42. As shown in FIGS. 2a and 3, the means for enhancing heat conduction may comprise a series of corrugations 54 which are maintained in thermal contact with the parallel plates. The intake channels 53 include corrugations which pass in a first direction and the exhaust channels 55 include corrugations which pass in a direction substantially at right angles to the corrugations of intake channels 53. This substantially crossflow arrangement between the corrugations assures that the flow on the intake side in the direction of arrow 50 flows only through intake channels 53, and that the air leaving the heat exchanger through exhaust channels 55 in the direction of arrow 52 exits only through exhaust channels 55. This ensures that the heat exchanger operates with a crossflow airstream to facilitate the heat exchange process at the heat conducting walls or plates 42.

Figure 4:
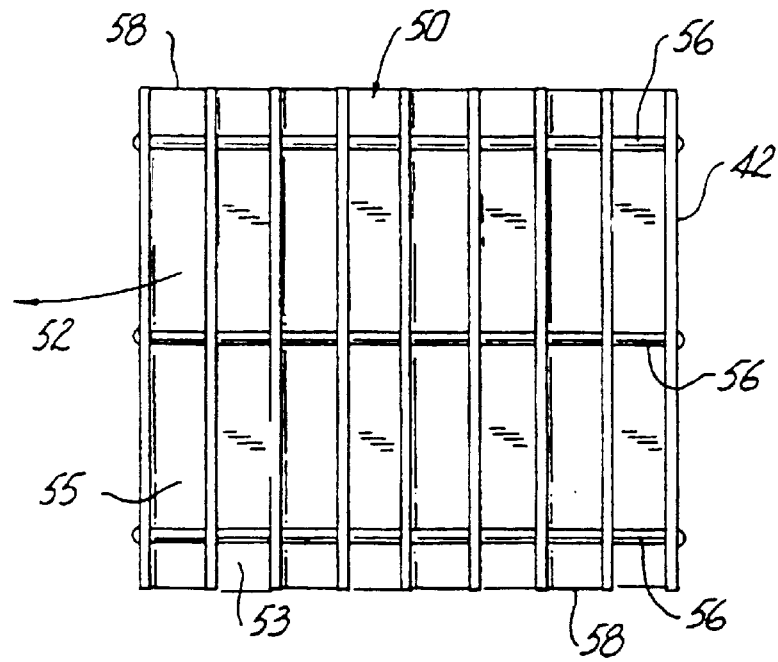
FIG. 4 illustrates a side plan view of an alternate embodiment of the heat conducting walls showing heat conducting spaces positioned between the walls of the plate-type heat exchanger of FIG. 2.
Figure 5:
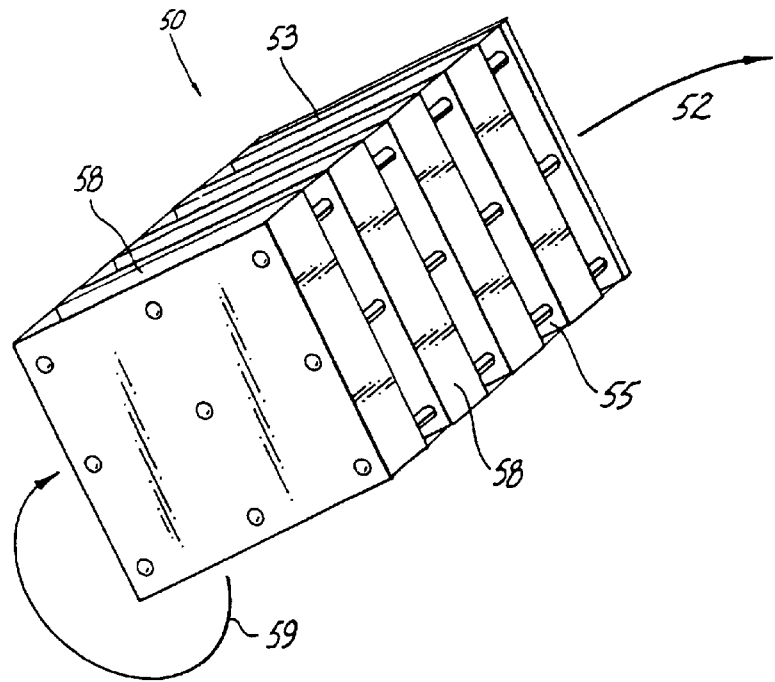
FIG. 5 illustrates a perspective view of the heat conducting walls of the embodiment of FIG. 4 showing the flow blocking plates.

FIG. 4 illustrates an alternate embodiment of the heat exchanger in which the heat conducting walls or plates 42 are separated by heat conducting spacers 56 which enhance the heat transfer between the walls or plates. Blocking members 58 are provided in this embodiment which cover the exhaust channels 55 on the intake side, and further are provided to block the intake channels 53 on the exhaust side. (The blocking members 58 on the exhaust side are not shown in FIG. 4 for clarity.) Turning now to FIG. 5, there is shown the embodiment of FIG. 4 with the blocking members 58 in place. Air entering the heat exchanger in the direction of the arrow 50 on the intake side at intake channels 53 is prevented from entering the exhaust channels 55 by the blocking members 58, and after the air passes over the cooling coils (not shown) and is redirected in the plenum chamber, as at arrow 59, to exit the heat exchanger in the direction of arrow 52, the blocking members 58 prevent the air from entering the intake channels 53 as the air flows through exhaust channels 55 in that direction.

Figure 6:
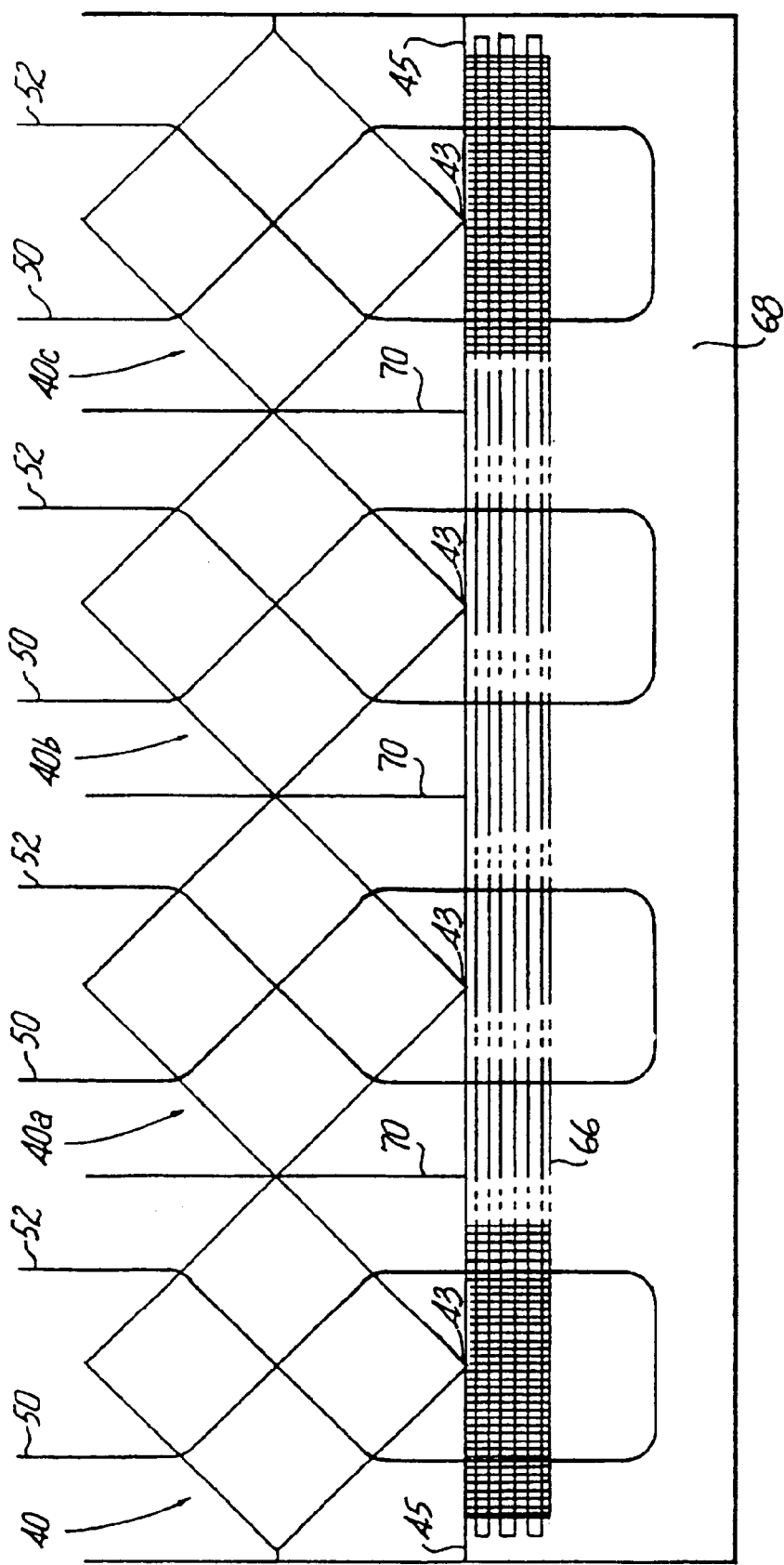
FIG. 6 illustrates a system utilizing plate-type crossflow air-to-air heat exchangers positioned in series according to the present invention.
Figure 7:
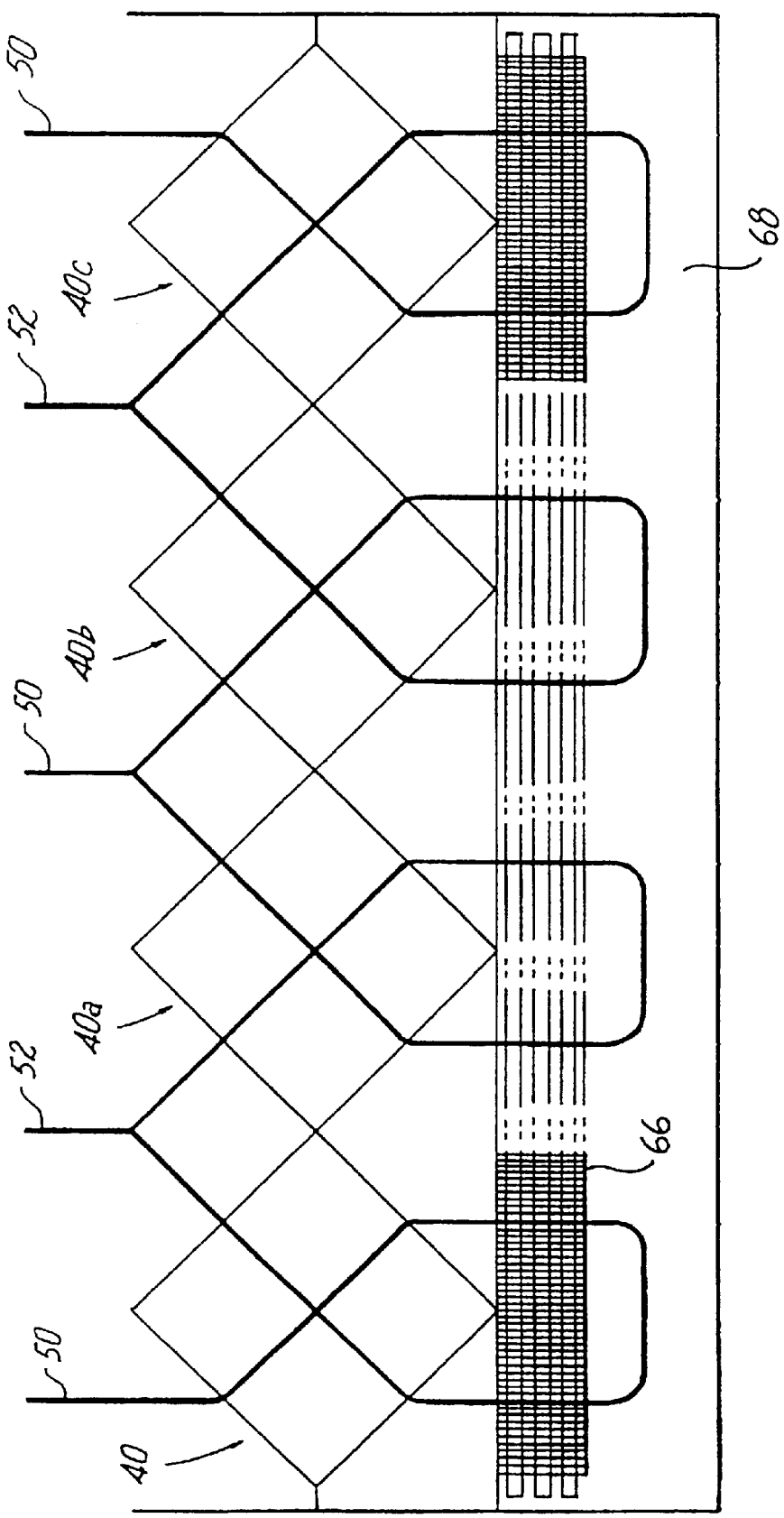
FIG. 7 illustrates the system of FIG. 6 with modified intake and exhaust flow paths.

FIG. 6 illustrates the heat exchanger 40 utilized in a system which permits a plurality of heat exchangers 40, 40a, 40b and 40c to be arranged in series arrangement to handle large volumes of air in an economical and efficient manner. In this embodiment, air enters each of the intake ports of the heat exchangers in the direction of arrow 50, is precooled as it passes through the intake channels 53 of heat conducting plates 42 and enters the plenum chamber 68 for further cooling and for condensing the water vapor entrained in the airstream as it passes over cooling coil 66. Walls 70, beads 43, and ledge members 45 ensure that the intake airflow and exhaust airflow are not mixed. The air is then redirected as shown and passes over the cooling coil 66 a second time and re-enters the exhaust channels 55 of heat conducting plates 42 of the heat exchanger to permit the transfer of heat in the heat conducting walls 42 to warm the airstream as it exits the heat exchanger in the direction of arrow 52. The embodiment of FIG. 6 provides a common plenum chamber 68, as well as a common cooling coil 66 as shown. FIG. 7 is similar to FIG. 6 except the intake airflow 50 and exhaust airflow 52 are consolidated to eliminate several ports and to enable the elimination of separating walls 70.

Figure 8:
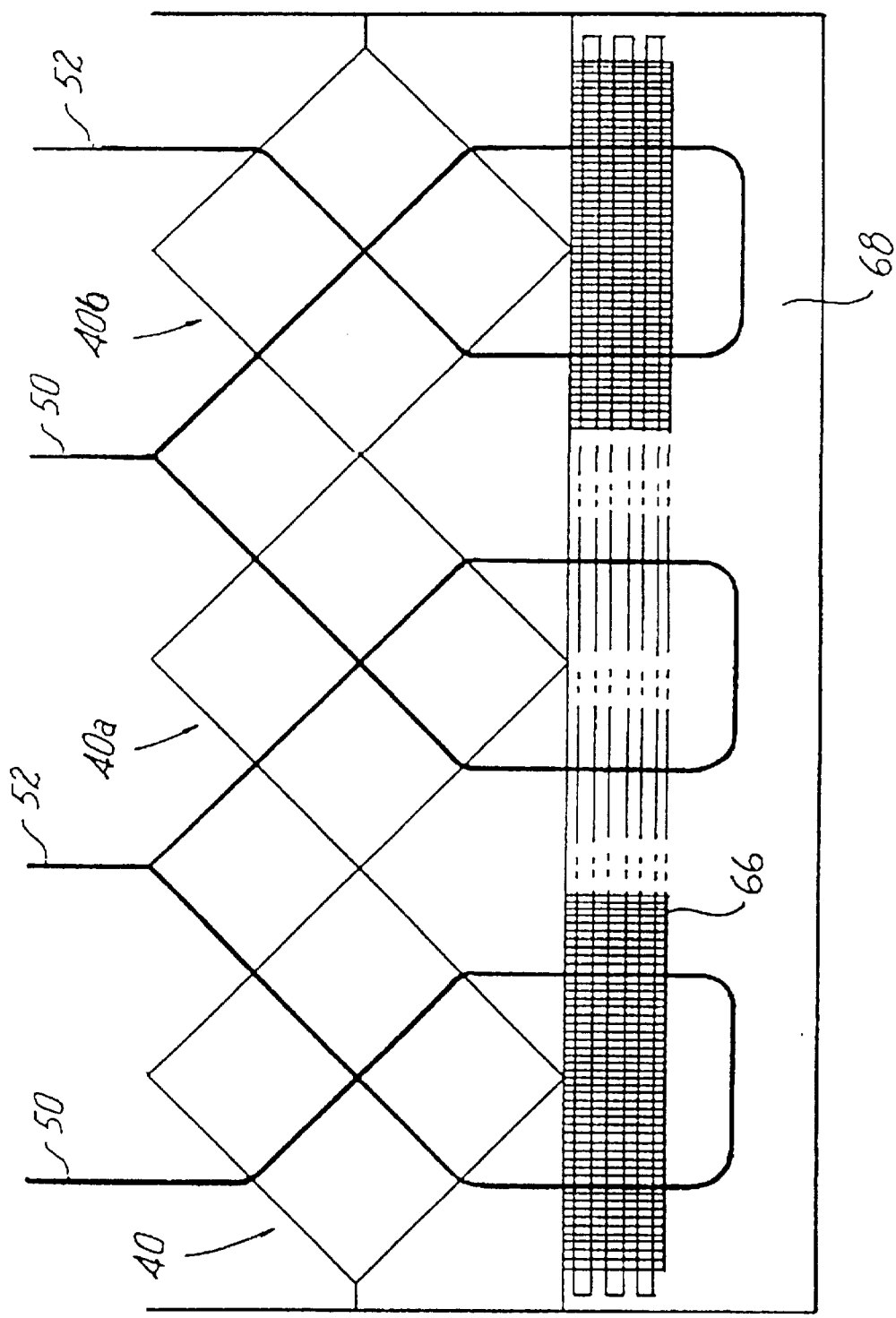
FIG. 8 illustrates three plate type cross flow air to air heat exchangers positioned edge corner to edge corner according to the present invention.

FIG. 8 illustrates the heat exchanger 40 utilized in a system which permits a plurality of plate heat exchangers 40, 40a, and 40b to be arranged in an edge corner to edge corner arrangement to handle large volumes of air in an economical and energy efficient manner. In this embodiment, air enters each of the intake sides of the plate heat exchangers 40, 40a, and 40b in the direction of arrow 50, is precooled as it passes through the intake channels of the plate heat exchangers 40, 40a, and 40b, and enters the plenum chamber 68 for further cooling and for condensing the water vapor entrained in the air stream as it passes through cooling coil 66. The air is then redirected as shown and passes through the cooling coil 66 for a second pass and enters the exhaust channels 55 of the heat conducting plates 42 of the plate heat exchangers 40, 40a, and 40b to permit the transfer of heat in the heat conducting plates 42 to warm the air stream as it exits the plate heat exchangers 40, 40a, and 40b in the direction of arrow 52. The embodiment of FIG. 8 provides a common plenum chamber 68, as well as a common cooling coil 66 as shown.

Figure 9:
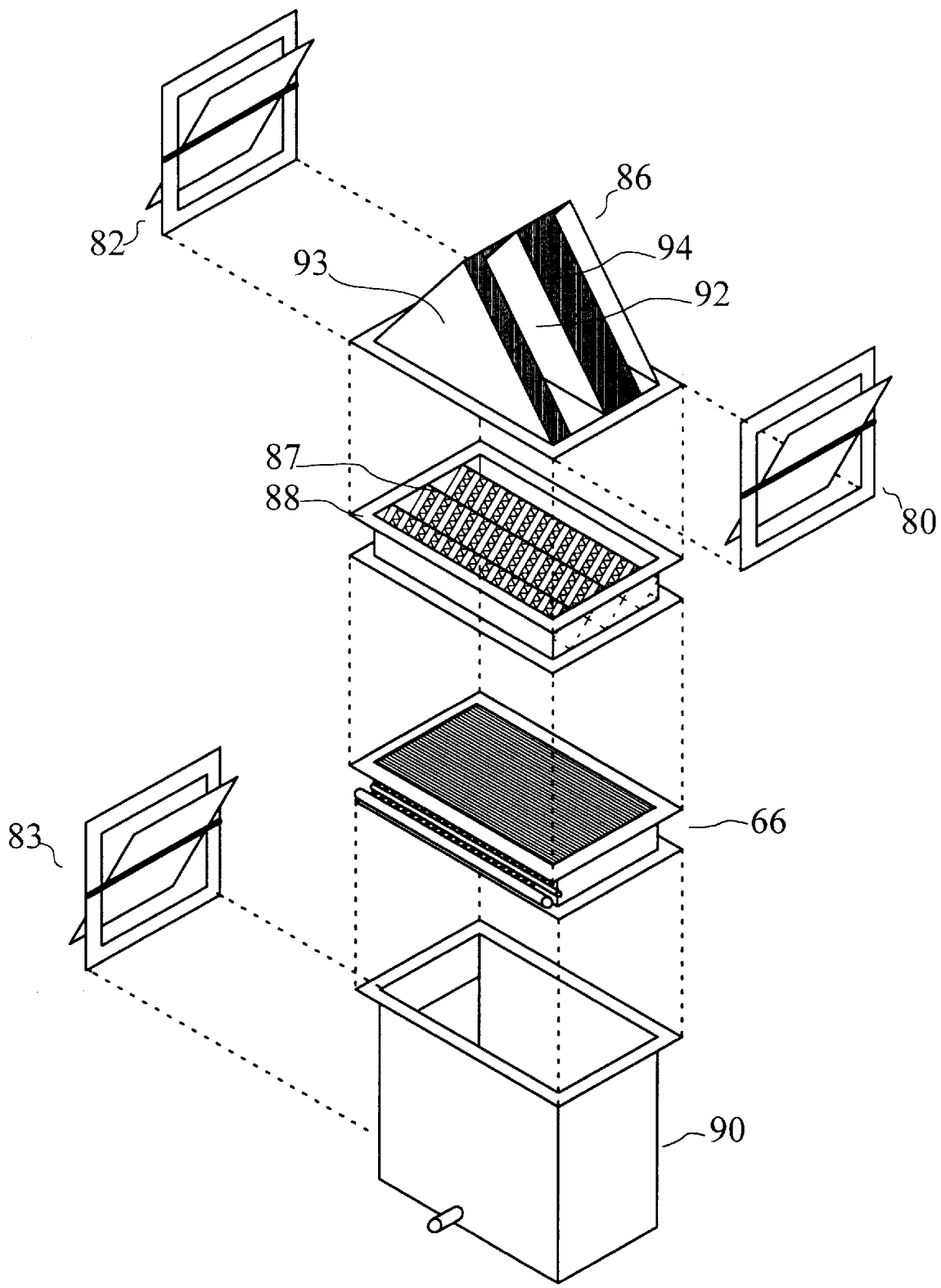
FIG. 9 is an exploded view of the system depicting the exhaust and intake dampers, manifold assembly, plate heat exchanger assemblage, plate heat exchanger frame, cooling coil, condensate collection chamber, and cooling damper.

FIG. 9 is an exploded view of the system depicting an intake damper 80, an exhaust damper 82, a cooling damper 83, the manifold assembly 86, a plate heat exchanger assemblage 87, a plate heat exchanger frame 88, the cooling coil 66, and a condensate collection chamber 90. A series of dividers 92 separate plenums 94 in the manifold assembly 86. The ends 93 are substantially parallel to dividers 92. The dividers 92 and the ends 93 are also substantially perpendicular to the plates of the plate heat exchanger assemblage 87. The plate heat exchanger frame 88 is substantially rectangular in shape. Intake damper 80 and exhaust damper 82 are disposed substantially perpendicularly with respect to the dividers 92 and the triangular ends 93. Dividers 92 and ends 93 define, for example, isosceles triangles, with the base lying substantially even with the top plane of the plate heat exchanger frame 88. Other triangular shapes can be utilized to advantage, as can other geometric configurations, such as square, rectangle, etc. The cooling coil 66 is attached to and located beneath the plate heat exchanger assemblage 87 and plate heat exchanger frame 88. The condensate collection chamber 90 is attached to the cooling coil 66. The cooling damper 83 is disposed on the condensate collection chamber 90.

Figure 10B:
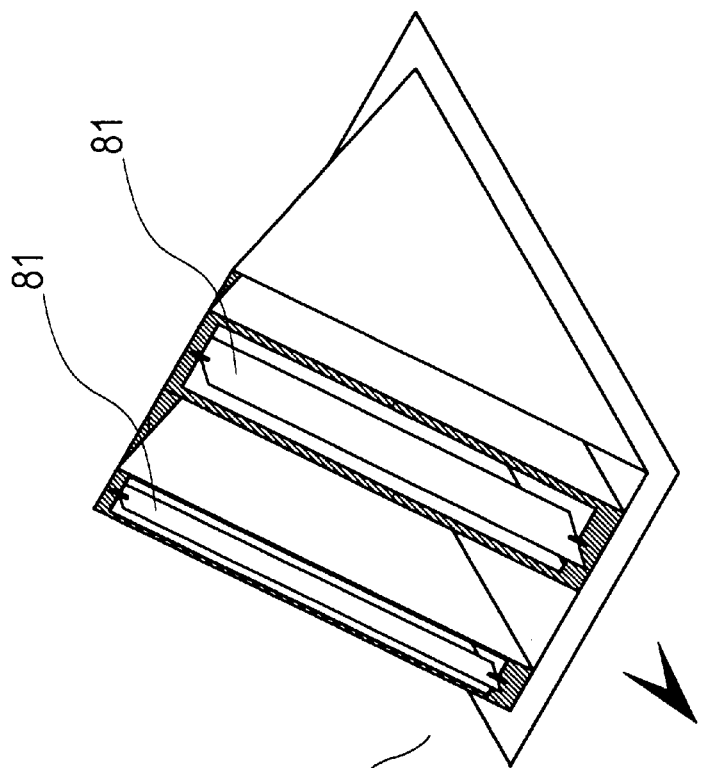
FIG. 10a and 10b are views of the baffle dampers set in the manifold assembly as viewed from the exhaust and intake air streams.
Figure 10A:
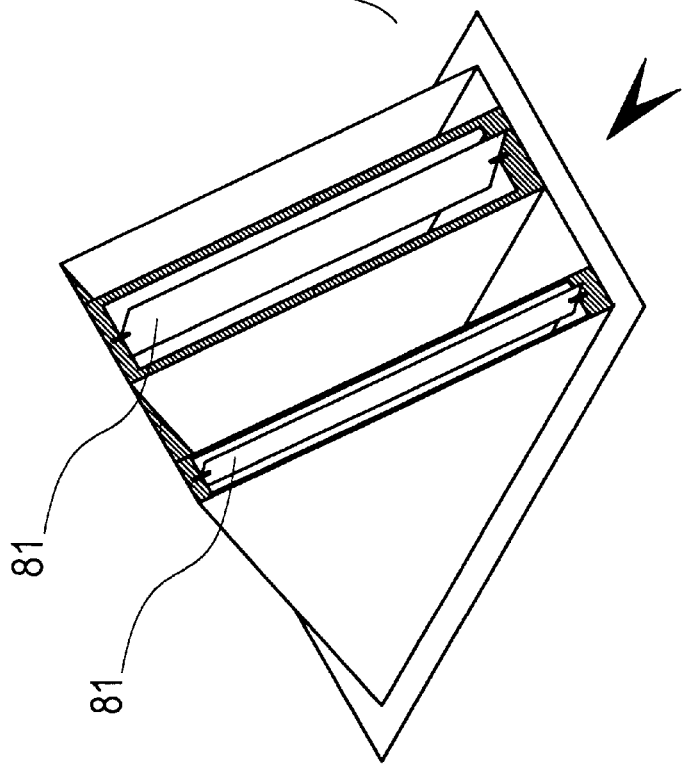

FIGS. 10a and 10b depict the manifold assembly 86, which contains the baffle dampers 81. The baffle dampers are shown disposed on both sides of the manifold assembly 86 which is triangular in configuration. FIG. 10b is a view of the intake of the manifold assembly 86, and FIG. 10a is a view of the exhaust of the manifold assembly 86. The baffle dampers alternate on the intake and on the exhaust of the manifold assembly, leaving openings between the baffle dampers 81.

In the following description of damper operation, if one or more of the exhaust 82, intake 80, or cooling dampers 83 is fixed in the open position, the open damper(s) can be eliminated from the system without affecting its operation, provided that the open damper(s) will otherwise permit the system to operate. In addition, if the baffle dampers 81 are fixed in the closed position, then the system would function in the same manner as if there were no apertures in the baffles, allowing air to pass.

Figure 11:
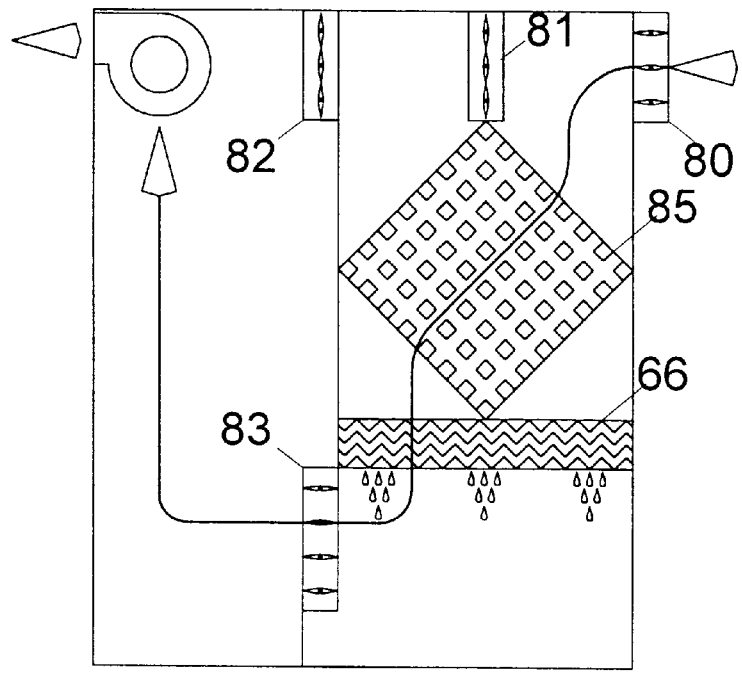
FIG. 11 is a simplified air flow schematic showing operation of the system in cooling mode.

FIG. 11 is a simplified air flow schematic showing operation of the system in cooling mode. For reasons of clarity, only one assemblage of plate heat exchangers 85 is shown in FIGS. 13 to 17. In the cooling mode, the intake damper 80 damper is open, while baffle damper 81 and exhaust damper 82 are closed, allowing air to be conducted for a single pass through the cooling coil 66. In the cooling mode, the cooling damper 83 is open.

Figure 12:
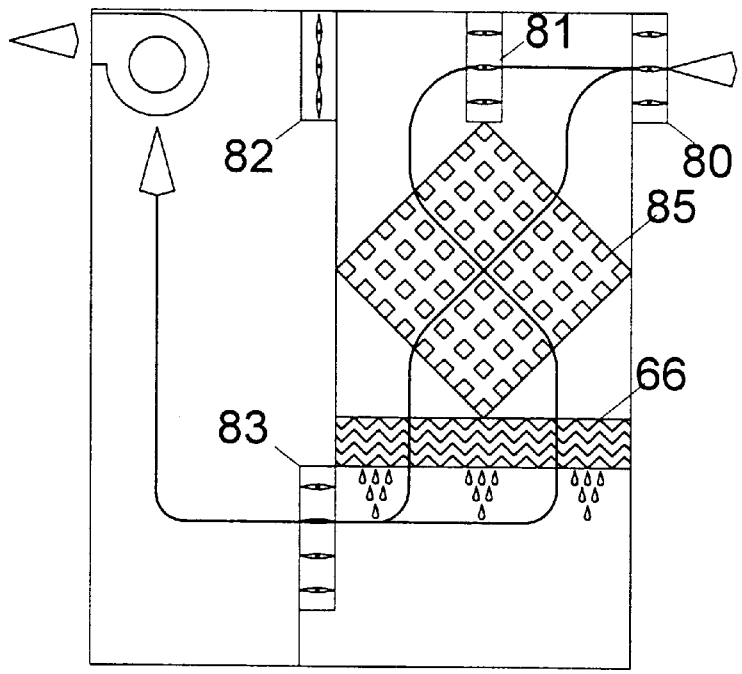
FIG. 12 is a simplified air flow schematic showing operation of the system in maximum cooling mode.

FIG. 12 is a simplified air flow schematic showing operation of the system in its maximum cooling mode. The intake damper 80 and the baffle damper 81 are both open, permitting air to flow through both sides of the plate heat exchanger 85 prior to being conducted through both halves of the cooling coil 66. In this mode of operation, the cooling damper 83 is in the open portion and the exhaust damper 82 is closed.

Figure 13:
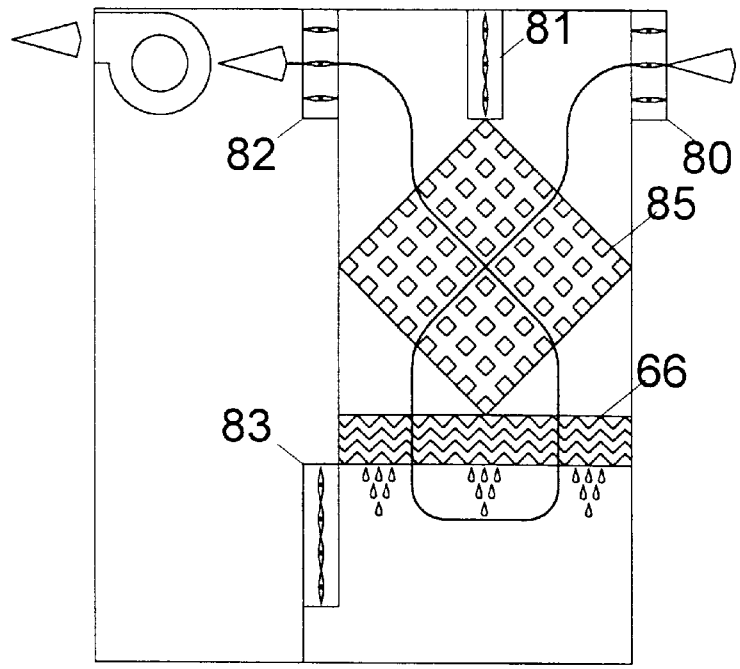
FIG. 13 is a simplified air flow schematic showing operation of the system in dehumidification mode.

FIG. 13 is a simplified air flow schematic showing operation of the system in dehumidification mode. The intake damper 80 and the exhaust damper 82 are open, while the baffle damper 81 and the cooling damper 83 is closed. Air flows through the first pass of the heat exchanger 85, then through the cooling coil 66 where it makes two passes through the cooling coil 66 prior to being reheated by the plate heat exchanger 85 and being exhausted to the environment through the open exhaust damper 82.

Figure 14:
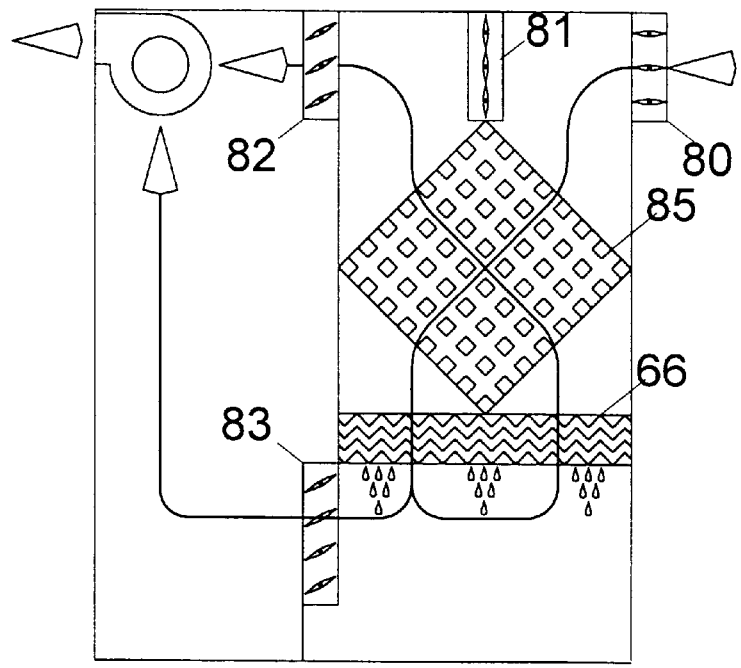
FIG. 14 is a simplified air flow schematic showing operation of the system in simultaneous dehumidification and cooling mode.

FIG. 14 is a simplified air flow schematic showing the operation of the apparatus of the present invention in its dehumidification and cooling modes. The intake damper 80 is open, and the baffle damper 81 is closed. The exhaust damper 82 and the cooling damper 83 may operate in unison but opposite each other. For example, when the exhaust damper is opening, the cooling damper is closing or the cooling damper may operate independently with the exhaust damper open. Consequently, a first stream or portion of air can flow through on the first pass through the heat exchanger 85 and the cooling coil 66 to achieve cooling, while at the same time another stream or portion of air can flow through the system to obtain dehumidification as described with respect to the operation depicted in FIG. 13.

Figure 15:
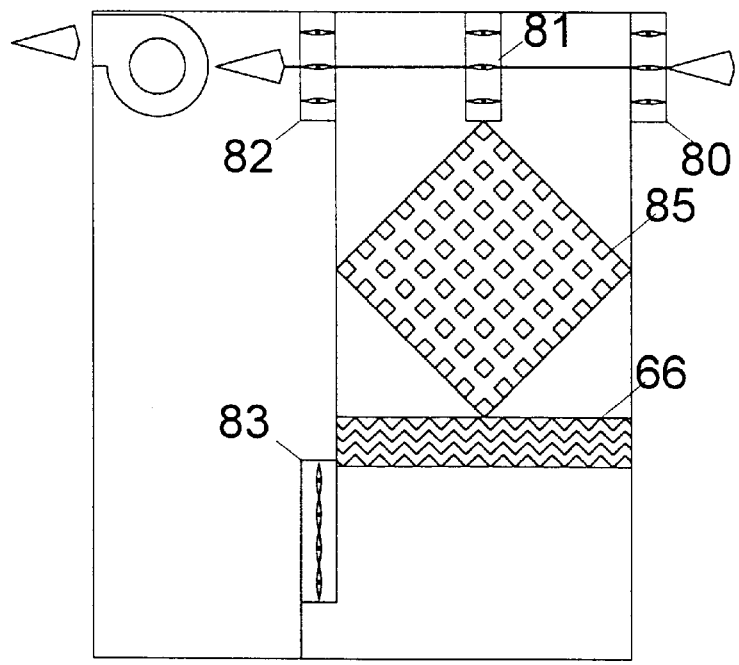
FIG. 15 is a simplified air flow schematic showing operation of the system in bypass mode.

FIG. 15 depicts operation of the system in the bypass mode. The intake damper 80, the baffle damper 81, and the exhaust damper 82 are all maintained in the open position, while the cooling damper 83 is in the closed condition.

Figure 16:
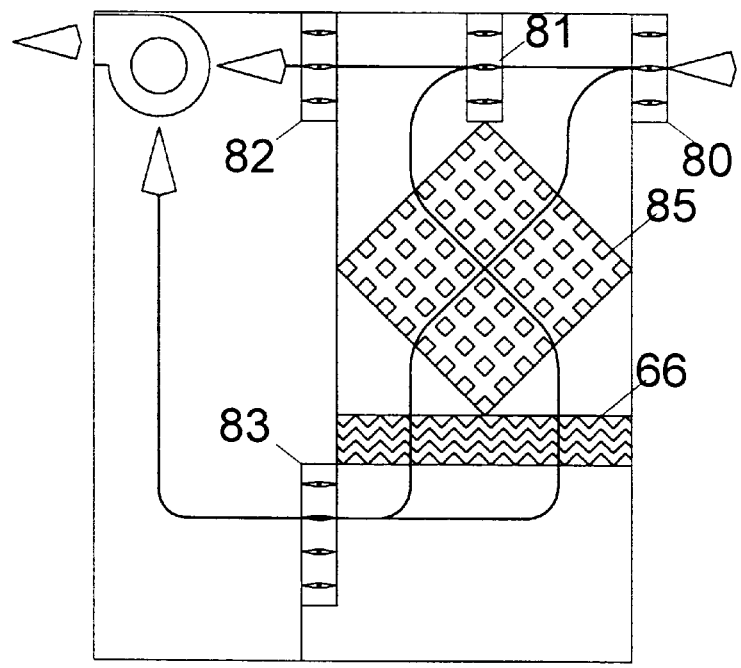
FIG. 16 is a simplified air flow schematic showing operation of the system in maximal bypass mode.

FIG. 16 shows operation of the system in maximum bypass mode. All four dampers 80, 81, 82 and 83 are in the open position, and the air can flow through the system with the lowest possible frictional static pressure losses.

Figure 17:
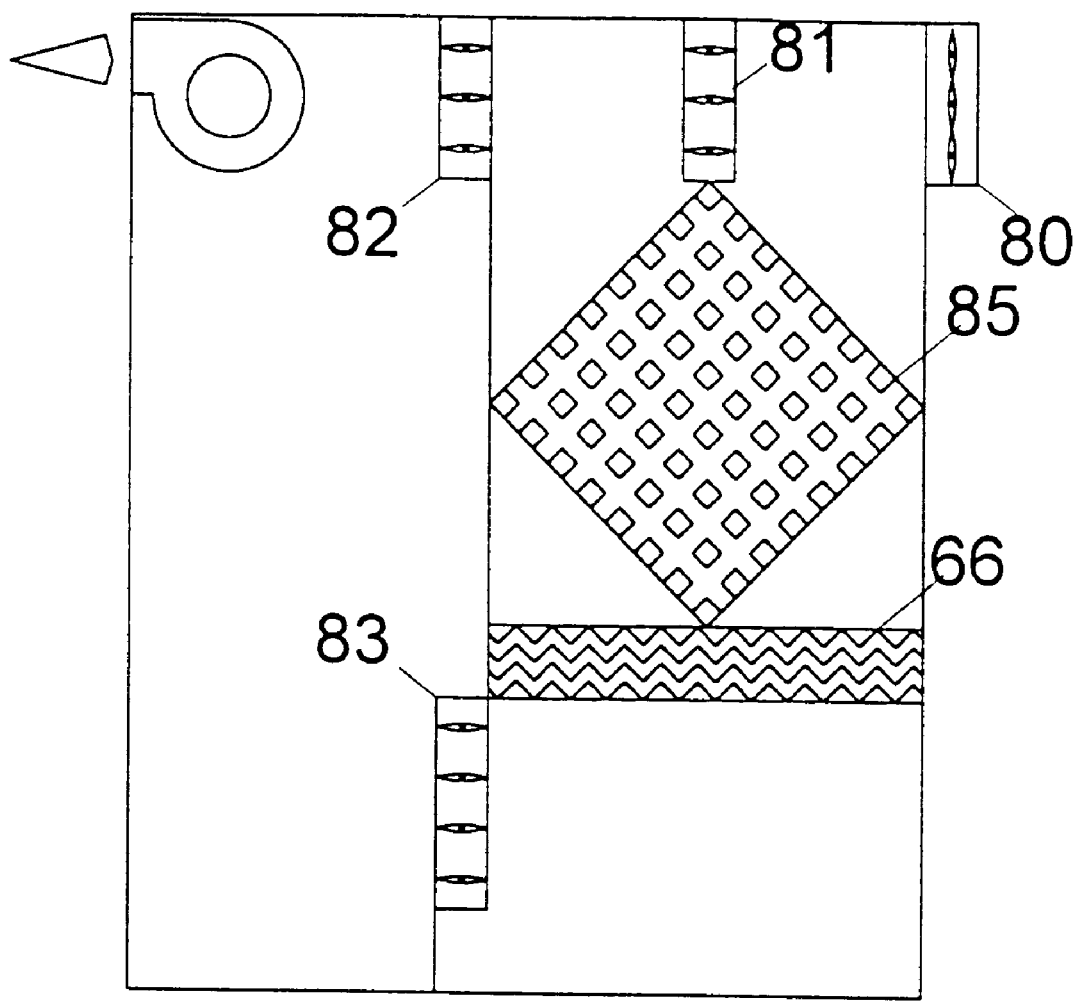
FIG. 17 is a simplified air flow schematic showing operation of the system in shutdown mode.

FIG. 17 shows operation of the system in shutdown mode with damper 80 being closed.

In the bypass, maximum bypass, and shutdown modes, the cooling coil is shutdown, with no coolant going through any of the cooling coils.

While the invention has been particularly shown and described with reference to the preferred embodiments, it will be understood by those skilled in the art that various modifications and changes may be made without departing from the scope and spirit of the invention. Accordingly, modifications such as those suggested above, but not limited thereto, are to be considered within the scope of the invention.

What is claimed is:

1. A system for conditioning an air stream, comprising:

at least one fan for forcing air through said system, a first heat exchanger having an intake port, an exhaust port, a plenum chamber remote from said intake port and said exhaust port, and a plurality of heat conducting walls defining channels for passage of air from said intake port to said plenum chamber and from said plenum chamber to said exhaust port;

at least one other heat exchanger having an intake port, an exhaust port, a plenum chamber remote from said intake port and said exhaust port, and a plurality of heat conducting walls defining channels for passage of air from said intake port to said plenum chamber and from said plenum chamber to said exhaust port, wherein the heat exchangers are positioned adjacent to each other;

a common cooling conduit located in said plenum chamber of said first heat exchanger and said plenum chamber of said other heat exchanger;

said cooling conduit being positioned adjacent to and spaced from said heat conducting walls of said first heat exchanger and said other heat exchanger;

said cooling conduit being positioned in a plane parallel to a plane defined by said plurality of heat conducting walls in said first heat exchanger and said other heat exchanger;

said first heat exchanger and said at least one other heat exchanger being secured to a frame which is disposed substantially parallel to the plane of said heat exchangers;

a manifold assembly including a manifold exhaust port and a manifold intake port, said manifold exhaust port associated with an exhaust damper disposed in the exhaust airstream, said manifold intake port associated with an intake damper disposed in the intake airstream, at least one baffle damper disposed between said intake damper and said exhaust damper and adapted to selectively control the airflow through said manifold intake and manifold exhaust ports of said manifold assembly;

a condensate collection means disposed below said cooling conduit; and a cooling damper integral with said condensate collection means, whereby the air stream is cooled, dehumidified, or both, in response to the selective orientation of the dampers.

2. A system according to claim 1, wherein said plenum chamber of said first heat exchanger is in fluid communication with said plenum chamber of said other heat exchanger.

3. A system according to claim 1, wherein said intake port of said first heat exchanger is in fluid communication with said intake port of said other heat exchanger.

4. A system according to claim 3, wherein said exhaust side of said first heat exchanger is in fluid communication with said exhaust side of said other heat exchanger.

5. A system according to claim 2, wherein said plenum chamber of said first heat exchanger and said plenum chamber of said other heat exchanger is a common plenum chamber.

6. A system according to claim 1, further comprising a plurality of heat exchangers arranged edge corner to edge corner including a common plenum chamber and said common cooling conduit.

7. A system according to claim 1 wherein to operate in a cooling mode the intake damper and cooling dampers are open and the at least one baffle damper and the exhaust damper are closed allowing the air stream to make a single pass through the cooling conduit.

8. A system according to claim 1 wherein to operate in a maximum cooling mode the intake damper, the at least one baffle damper and the cooling damper are open and the exhaust damper is closed allowing the airstream to pass through the cooling conduit.

9. A system according to claim 1 wherein to operate in a dehumidification mode the intake and exhaust dampers are open while the at least one baffle damper and the cooling damper are closed allowing the air stream to first pass through the heat exchanger, then pass twice through the cooling conduit and after being reheated by passing through the plate heat exchanger being exhausted through the exhaust damper.

10. A system according to claim 1 wherein to operate in combined dehumidification and cooling modes the intake damper is open, the at least one baffle damper is closed, and the exhaust and cooling dampers alternate between open and closed, in unison and opposite to one another, allowing a first portion of the airstream to pass once through the heat exchanger, once through the cooling conduit and then to mix with a second portion of the airstream that passes through the heat exchanger, twice through the cooling conduit and back through the heat exchanger prior to passing through the exhaust damper and mixing with the first portion of the airstream.

11. A system according to claim 1 wherein to operate in air bypass mode the intake damper, the at least one baffle damper and the exhaust damper are open allowing air to substantially bypass the heat exchanger and the cooling conduit while the cooling damper is either open or closed thereby lowering the system pressure drop and reducing the fan power requirement.

12. system according to claim 1 wherein to operate in shutdown mode the system fan shuts down and the intake damper closes.

* * * * *